United States Patent
Robbins et al.

(10) Patent No.: US 8,992,813 B2
(45) Date of Patent: Mar. 31, 2015

(54) SHEET MOLDING COMPOUND WITH CORES

(75) Inventors: Jeffrey R. Robbins, Ann Arbor, MI (US); Jeremy Alan Panasiewicz, Macomb, MI (US); Louis Dodyk, Marion, IN (US)

(73) Assignee: Magna International Inc., Aurora (CA)

( * ) Notice: Subject to any disclaimer, the term of this patent is extended or adjusted under 35 U.S.C. 154(b) by 804 days.

(21) Appl. No.: 12/928,803

(22) Filed: Dec. 20, 2010

(65) Prior Publication Data

US 2011/0150661 A1  Jun. 23, 2011

Related U.S. Application Data

(60) Provisional application No. 61/284,486, filed on Dec. 18, 2009.

(51) Int. Cl.
  *B29C 70/18* (2006.01)
  *B29C 70/46* (2006.01)
  (Continued)

(52) U.S. Cl.
  CPC .......... *B29D 99/0025* (2013.01); *B29C 70/086* (2013.01); *B29C 70/18* (2013.01); *B29C 70/865* (2013.01); *B29L 2031/08* (2013.01); *Y02E 10/721* (2013.01)
  USPC ........... 264/258; 264/296; 264/136; 264/321; 264/324; 428/47

(58) Field of Classification Search
  CPC .... B29C 43/206; B29C 70/34; B29C 70/345; B29C 70/30; B29C 70/40; B29C 43/02; B29C 43/189; B29C 43/185; B29C 66/72; B29C 65/483; B29C 66/729
  USPC .................................................. 264/258, 136
  See application file for complete search history.

(56) References Cited

U.S. PATENT DOCUMENTS 3,062,697 A * 11/1962 Novak .......................... 156/178
3,321,019 A * 5/1967 Dmitroff et al. .......... 416/229 R
(Continued)

FOREIGN PATENT DOCUMENTS

| DE | 30 02 584 B1 | 5/1981 |
| DE | 198 14 039 A1 | 10/1999 |
| WO | WO 2010/046698 A1 | 4/2010 |

OTHER PUBLICATIONS

Kong, C., et al., Structural investigation of composite wind turbine blade considering various load cases and fatigue life, Energy, vol. 30 (2005), pp. 2101-2114.*

(Continued)

*Primary Examiner* — Matthew Daniels
(74) *Attorney, Agent, or Firm* — Warn Partners, P.C.

(57) ABSTRACT

A component made of at least one thermoformable material, having a first layer made of a first material, a second layer made of a second material, and a third layer made of the first material. The three layers form a sheet, which is formed to various shapes, depending upon the part that is to be created. The sheet may be formed to produce the bumper of an automobile, a door panel for an automobile, a flotation device, such as a pontoon for a pontoon boat, or the like. The first and third layers are SMC, and the second layer, or "core," is disposed between the first and third layers, allowing the strength of the first and third layers to be used more efficiently, compared to a sheet having only the first and third layers, and no core.

14 Claims, 7 Drawing Sheets

(51) Int. Cl.
  *B29D 99/00* (2010.01)
  *B29C 70/08* (2006.01)
  *B29C 70/86* (2006.01)
  *B29L 31/08* (2006.01)

(56) References Cited

U.S. PATENT DOCUMENTS

| | | | | | |
|---|---|---|---|---|---|
| 3,573,144 | A | * | 3/1971 | Andersen | 428/48 |
| 3,647,317 | A | * | 3/1972 | Furlong et al. | 416/226 |
| 3,713,753 | A | * | 1/1973 | Brunsch | 416/226 |
| 3,920,871 | A | * | 11/1975 | Johnson | 428/54 |
| 4,264,278 | A | * | 4/1981 | Weingart | 416/226 |
| 4,298,417 | A | * | 11/1981 | Euler et al. | 156/228 |
| 4,302,155 | A | * | 11/1981 | Grimes et al. | 416/144 |
| 4,335,182 | A | * | 6/1982 | Brand et al. | 428/319.3 |
| 4,470,862 | A | * | 9/1984 | More et al. | 156/245 |
| 4,471,020 | A | * | 9/1984 | McCarthy | 428/309.9 |
| 4,780,167 | A | * | 10/1988 | Hill | 156/245 |
| 5,509,781 | A | * | 4/1996 | Boszor et al. | 415/200 |

OTHER PUBLICATIONS

Anonymous; "SMC for small wind turbine blades"; Composites World; May 3, 2009; retrieved from inernet "http://www.compositesworld.com/products/smc-for-small-wind-turbine-blades"; 1 page.

* cited by examiner

SHEET MOLDING COMPOUND WITH CORES

CROSS-REFERENCE TO RELATED APPLICATIONS

This application claims priority to U.S. Provisional Application No. 61/284,486 filed on Dec. 18, 2009. The disclosure of the above application is incorporated herein by reference.

FIELD OF THE INVENTION

The present invention relates to a sheet molding compound which includes a core for providing additional strength and reduced weight in a molded, one-piece part.

BACKGROUND OF THE INVENTION

Molding of various plastic materials is a common method used to create parts for various applications. One specific method of producing parts in this manner is through the use of a sheet molding compound (SMC). Several examples of SMC methods are Long Fiber Injection (LFI), Structural Reaction Injection Molding (SRIM), Reinforced Reaction Injection Molding (RRIM), or Vacuum Assisted Resin Transfer Molding (VARTM).

The method of making a part using LFI involves the use of fiberglass cut into long strands, or fibers, mixed with a resin to provide additional strength to a molded part. SRIM molding is similar to typical injection molding, except that thermosetting polymers are used, and the two parts of the polymer are mixed together an injected into a mold under high pressure, and are then allowed to cure. A reinforcing agent is used, such as glass fillers, in the mixture for improved strength. RRIM is another type of SRIM, in which a fiber mesh is used as the reinforcing agent; the fiber mesh is placed in the mold and the polymer mixture is then injection molded over it. VARTM is a process in which resin is inserted into a mold which contains layers of fibers or a preform; flow of resin is assisted by a vacuum in the mold.

There has been an increasing desire to create parts that are not completely solid, but rather have a type of insert in between layers of SMC. Having a part which is not completely solid is less costly, and is typically lighter in weight, while more effectively using the strength of the SMC.

While each of the methods described above has different advantages, for example, such as different types of resins may be used, they have also been met with various drawbacks in that each one of the above-mentioned processes requires additional manufacturing steps, increased tooling, and increased difficulty of assembly. Additionally, incorporating one of the above-mentioned manufacturing processes while using an insert to reduce the amount of SMC necessary requires the use of a heavy insert because a lightweight insert becomes crushed during the molding process.

Accordingly, there exists a need for a method of producing parts by molding an SMC over an insert or core which is lightweight and can withstand the various pressures and temperatures of molding, while maintaining a high strength to weight ratio.

SUMMARY OF THE INVENTION

The present invention is directed to a component made of at least one thermoformable material, having a first layer made of a first material, a second layer made of a second material, and a third layer made of the first material. The second layer is disposed between the first layer and the third layer such that the first layer and the third layer are bonded to the second layer.

The three layers form a sheet, which is formed to various shapes, depending upon the part that is to be created. The sheet may be formed to produce the bumper of an automobile, a door panel for an automobile, a flotation device, such as a pontoon for a pontoon boat, a surf board, a backboard for a basketball hoop, body panels for home appliances such as refrigerators or freezers, running boards for an automobile, wind blades, or the like.

The first and third layers are SMC, and the second layer, or "core," is disposed between the first and third layers, allowing the strength of the first and third layers to be used more efficiently, compared to a sheet having only the first and third layers, and no core.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
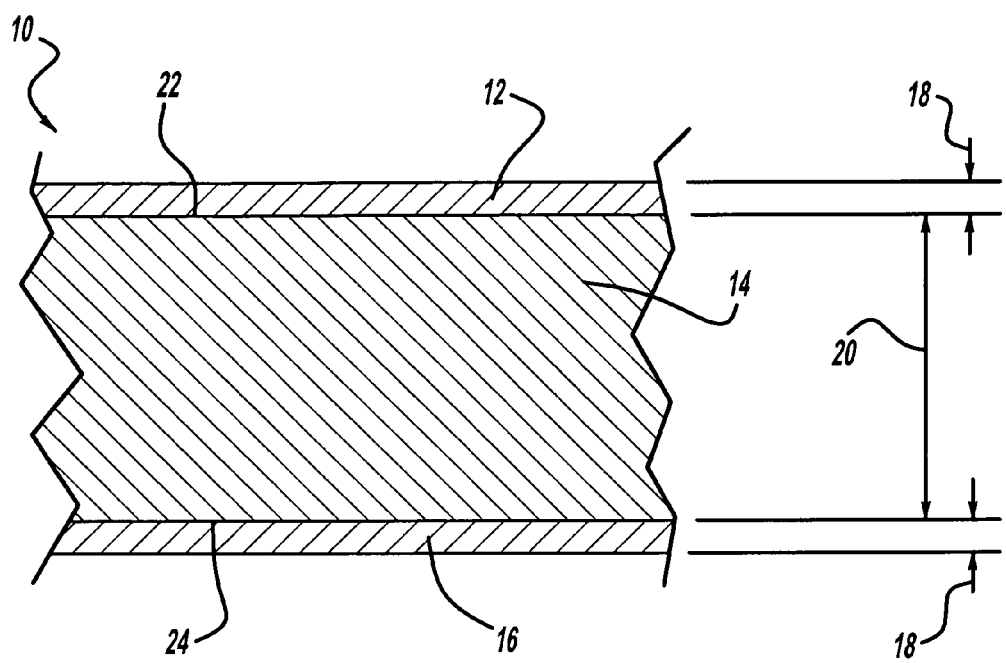
FIG. 1 is a sectional side view of a sheet molding compound (SMC) around a core, according to the present invention.

A section of a sheet of material made through the use of a sheet molding compound (SMC) process according to the present invention is shown in FIG. 1 generally at 10. SMC material may consist of, but are not limited to, a thermoset material, a polymer (such as polyester or vinylester) resin, inert fillers, fiber reinforcement, catalysts, pigments and stabilizers, release agents, and thickeners. The sheet 10 includes a first structural layer or top layer 12 along with a second or middle support layer, also referred to as a spatial support layer, or "core," 14, and a third structural layer or bottom layer 16. In an alternate embodiment, instead of SMC, the structural layers 12,16 are another type of pre-impregnated or "pre-preg" material, such as a Glass Mat Thermoplastic (GMT) material, Kevlar, E-Glass, carbon fiber materials, or any other pre-impregnated composite fiber material.

In this embodiment, the top layer 12 and bottom layer 16 are of a first thickness 18 of generally from about 1.0 millimeters to about 5.0 millimeters, typically about 1.0 millimeters to about 2.0 millimeters, and preferably about 1.3 millimeters to about 1.7 millimeters, and in a preferred embodiment the top layer 12 and the bottom layer 16 are each about 1.5 millimeters in thickness.

The middle support layer 14 is of a second thickness 20, which is generally from about 1.0 millimeters to about 50.8 millimeters, typically about 1.0 millimeters to about 25.4 millimeters, and preferably about 1.0 millimeters to about 5.0 millimeters. In the preferred embodiment, the core 14 is about 3.0 millimeters in thickness. The core 14 has a first side 22 and a second side 24; the top layer 12 is connected to the first side 22, and the bottom layer 16 is connected to the second side 24, the function of which will be described later.

The core 14 is made of one or more of many various materials, such as, but not limited to, polyesters, polypropylenes, polyurethanes, polyvinylchloride (PVC), or styrene acrylonitrile resin (SAN). Other types of materials may be suitable, depending upon the application and the amount of strength desired. Preferably, a light weight, low density foam made from these materials is used. The material selected preferably chemically bonds with the SMC material during molding. In one embodiment, the core 14 is a polymer core made of any suitable polymer.

Each of the top layer 12 and bottom layer 16 is made of an SMC material. To create the desired part, the core 14 is placed between the layers 12,16 of SMC material, and the entire assembly is placed into a heated molding tool, such as a mold. The top layer 12 and bottom layer 16 are flexible enough to allow for some bending when the layers 12,16 are placed in the mold to facilitate the shaping of the part. The mold may be of any shape, and in an alternate embodiment, the layers 12,16 are wrapped around the core 14 and placed in the mold. The layers 12,16 are also flowable when the mold is heated, which further facilitates the forming of the finished component. Additional charge material may be forced into the mold if necessary, to provide the desired shape if the layers 12,16 do not provide enough material to complete the finished component. The core 14 is also compressible, and can be partially pre-formed in the shape of the finished component, which also facilitates shaping of the component in the mold. In an alternate embodiment, the core 14 is used for providing spacing between the layers 12,16 only in certain areas of the sheet 10, where increased strength is needed most.

The tool is closed under a desired temperature and pressure, and the part cures. The part is removed from the tool as a one-piece part. In this embodiment, the assembly is cured at a temperature of generally in the range of about 200° Fahrenheit to about 400° Fahrenheit, typically in the range of about 250° Fahrenheit to about 350° Fahrenheit, and preferably in the range of about 280° Fahrenheit to about 320° Fahrenheit. In a preferred embodiment, the cure temperature is about 300° Fahrenheit, however, it is within the scope of the invention that the cure temperature may be more of less than 300° Fahrenheit, depending on the application, and the materials chosen for the layers 12,16 and the core 14.

The process is used to create various types of parts, such as components requiring maximum structural properties (e.g., floorboards of an automobile, or the bed of a semi-trailer), or components which are semi-structural (e.g., devices used for flotation, such as pontoons for a pontoon boat). The process described above is also for use in producing parts having a high-quality finish, such as a "Class-A" surface, which is required for components having a high-gloss finish, such as a door panel or a bumper for an automobile. Other components may also be created using the process described above, such as a surf board, a backboard for a basketball hoop, body panels for home appliances such as refrigerators or freezers, other appliances such as furnaces or air conditioners, running boards for an automobile, or a ramp for a trailer used to transporting an automobile, motorcycle, or the like.

Figure 9:
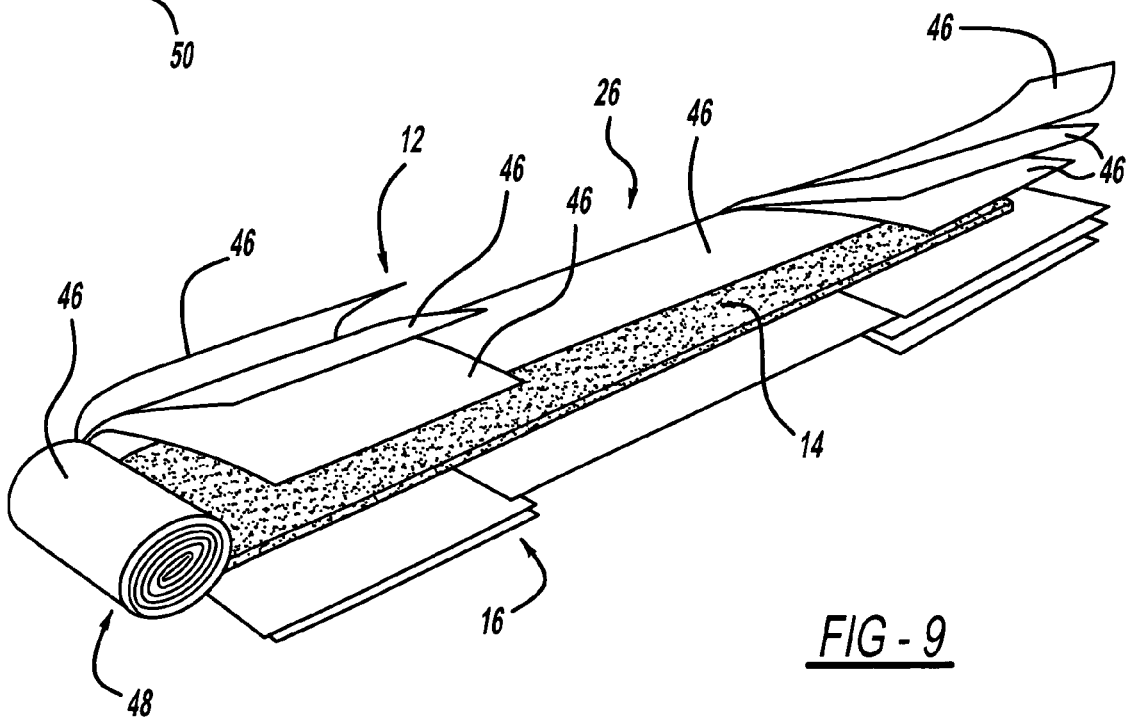
FIG. 9 is a perspective view of a one-piece wind blade made using an SMC, prior to being inserted into a mold, according to the present invention.

Referring to FIGS. 5-9, one embodiment of the present invention is shown as a one-piece wind blade 26, and the layers 12,14,16 are of made from a material such that when the blade 26 is a finished component, the blade 26 is strong enough to pass the strength requirements regulated by the International Electrotechnical Commission (IEC). During the manufacturing process, the top layer 12 and bottom layer 16 are several different individually cut sheets 46 of different sizes, best seen in FIG. 9. It can also be seen in FIG. 9 that additional sheets 46 are used along different areas of the blade 26 for providing a different contour or thickness, depending upon the desired shape of the blade 26. Furthermore, more or less sheets 46 may used, and cut to different sizes to facilitate forming the blade 26 to be of a different size, shape, or to have the layers 12,16 of different thicknesses. There is also an additional sheet 46 in roll form, shown generally at 48 placed at one end of the blade 26 which is used for forming a connector 50, shown in FIGS. 6 and 8. The blade 26 as shown in FIG. 9 is placed into a mold, and as the mold is heated, the sheets 46 melt to form the shape of the blade 26.

With regard to the thickness of the layers 12,14,16, it should be noted that it is within the scope of the invention that the top layer 12 and bottom layer 14 may be of greater or lesser thicknesses. It is also within the scope of the invention that the top layer 12 and the bottom layer 14 may also be of different thicknesses. Furthermore, the core 14 may have a greater or lesser thickness, depending upon the application and the type of material used to produce the core 14.

Figure 2:
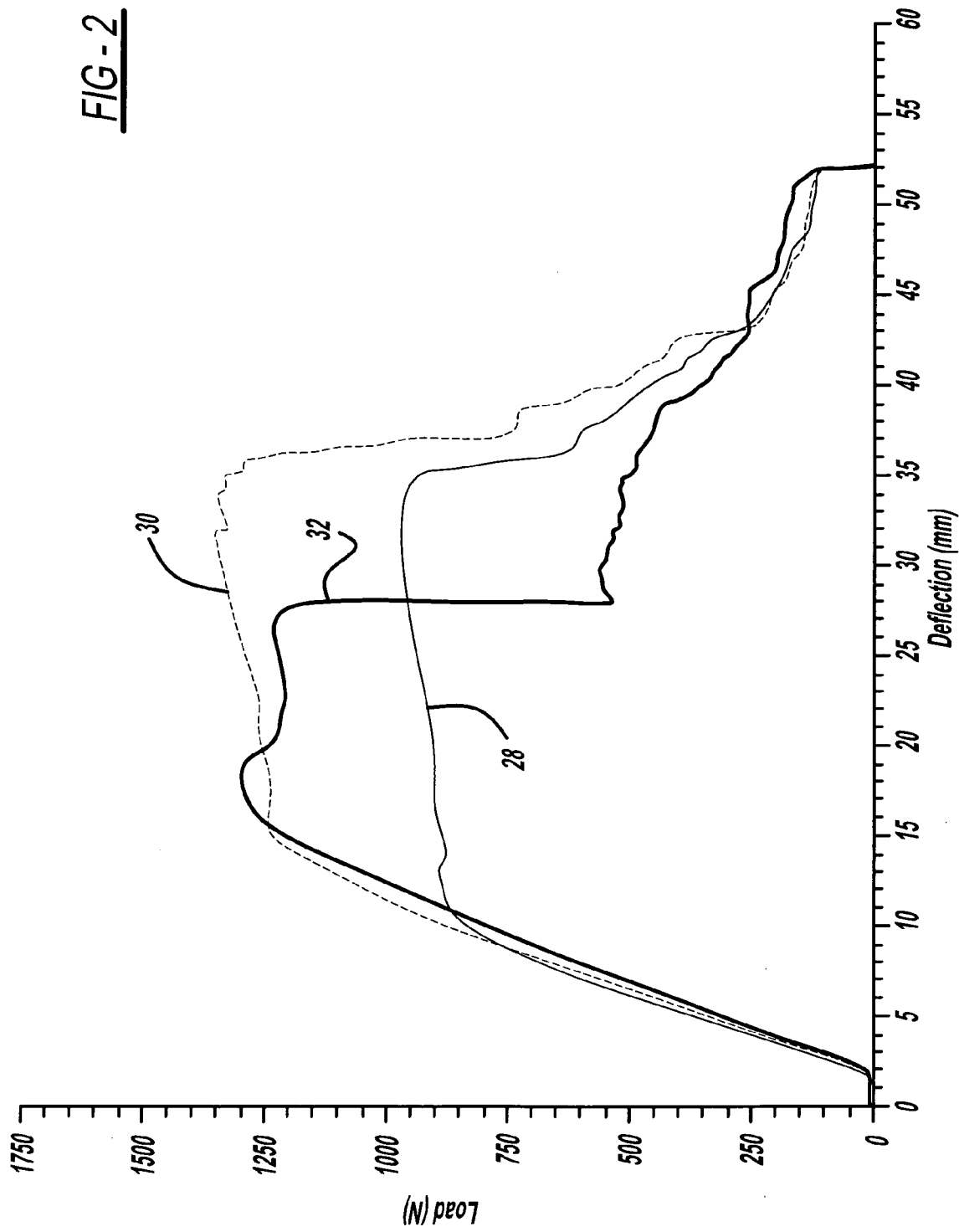
FIG. 2 is a first example of a graph showing strength versus deflection properties of a sheet of material made with an SMC and a core, according to the present invention.
Figure 3:
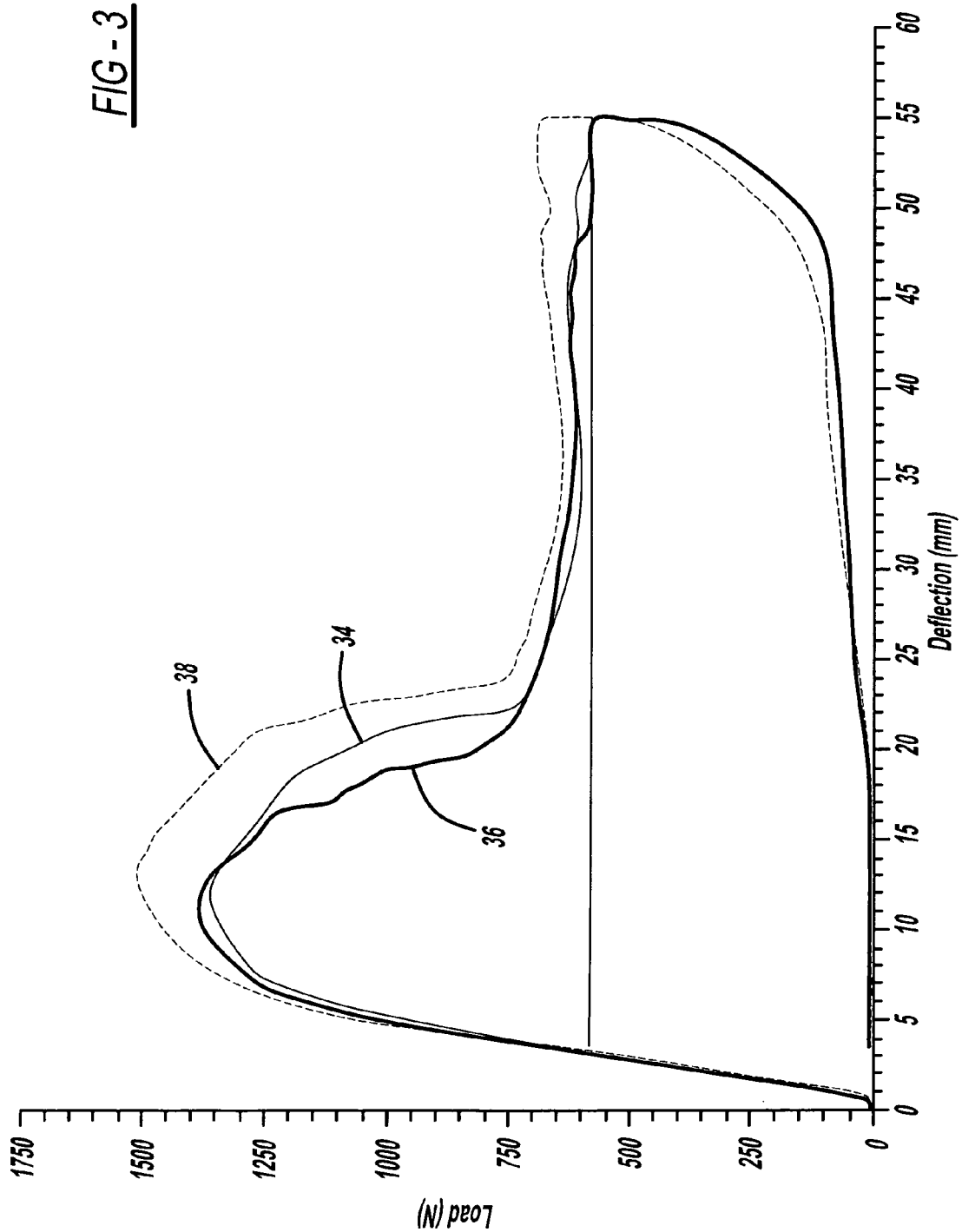
FIG. 3 is a second example of a graph showing strength versus deflection properties of a sheet of material made with an SMC and a core, according to the present invention.
Figure 4:
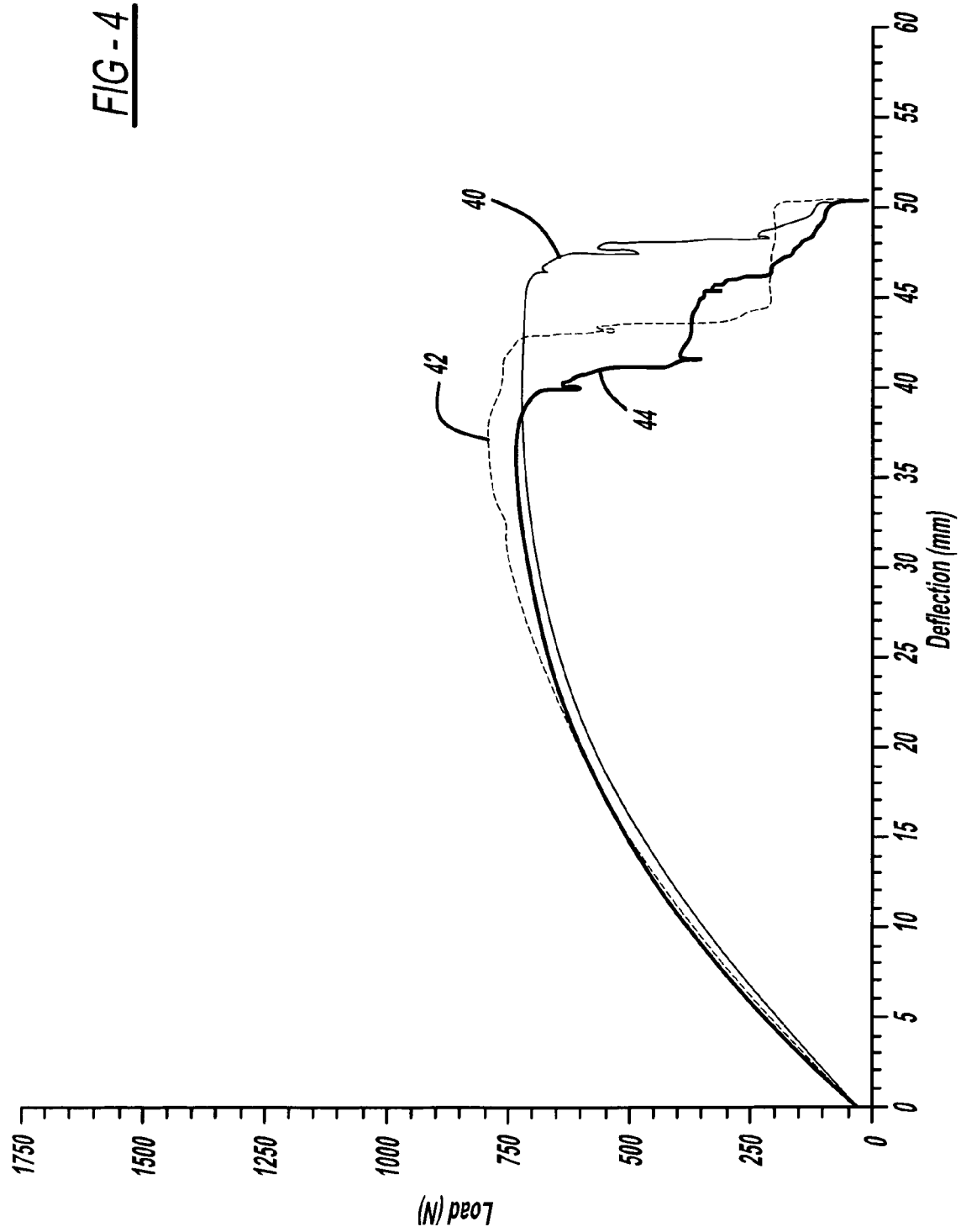
FIG. 4 is an example of a graph showing strength versus deflection properties of a sheet of material made with an SMC with no core, according to the present invention.
Figure 5:
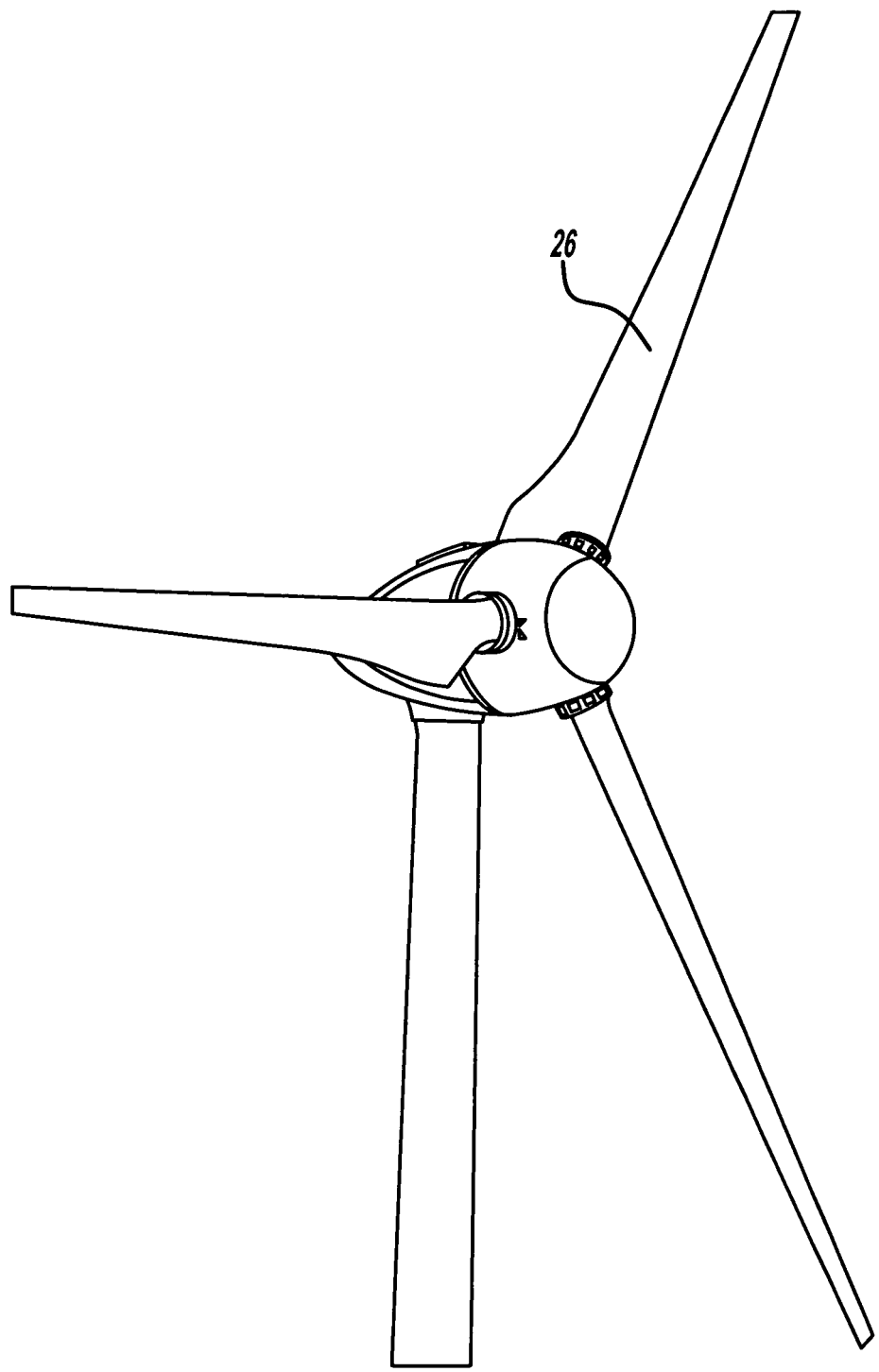
FIG. 5 is a first perspective view of a one-piece wind blade made using an SMC, according to the present invention.
Figure 6:
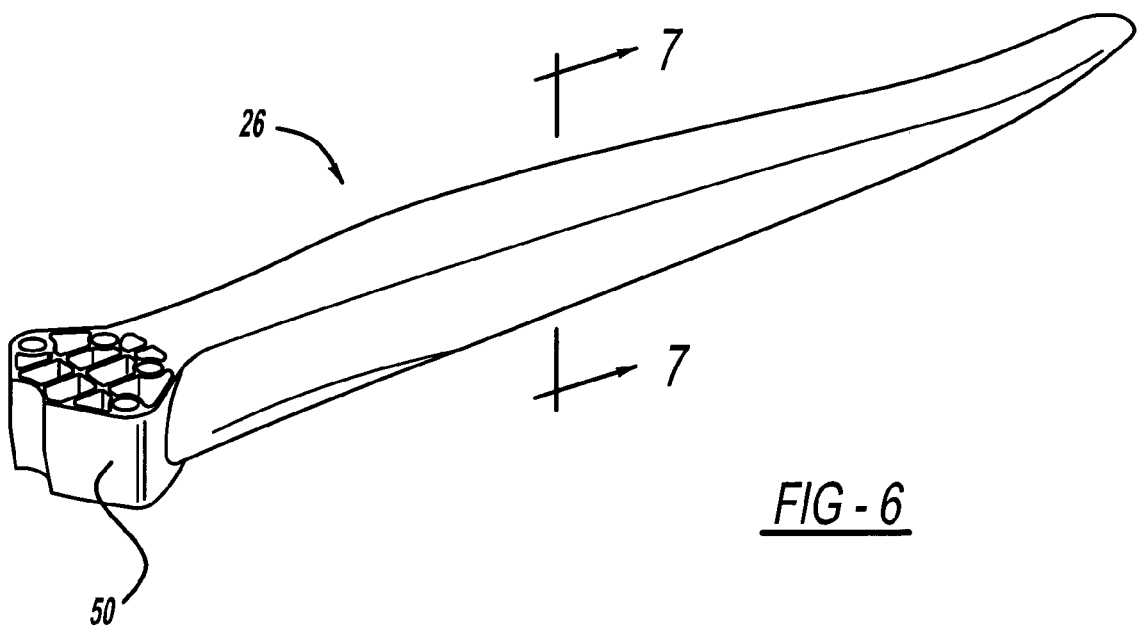
FIG. 6 is a second perspective view of a one-piece wind blade made using an SMC, according to the present invention.
Figure 7:
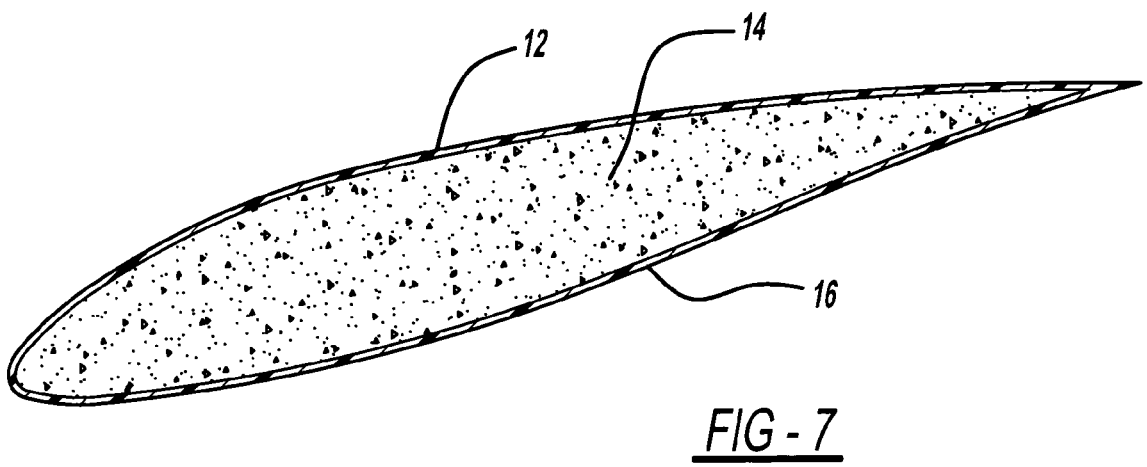
FIG. 7 is a sectional view taken along lines 7-7 of FIG. 6, according to the present invention.
Figure 8:
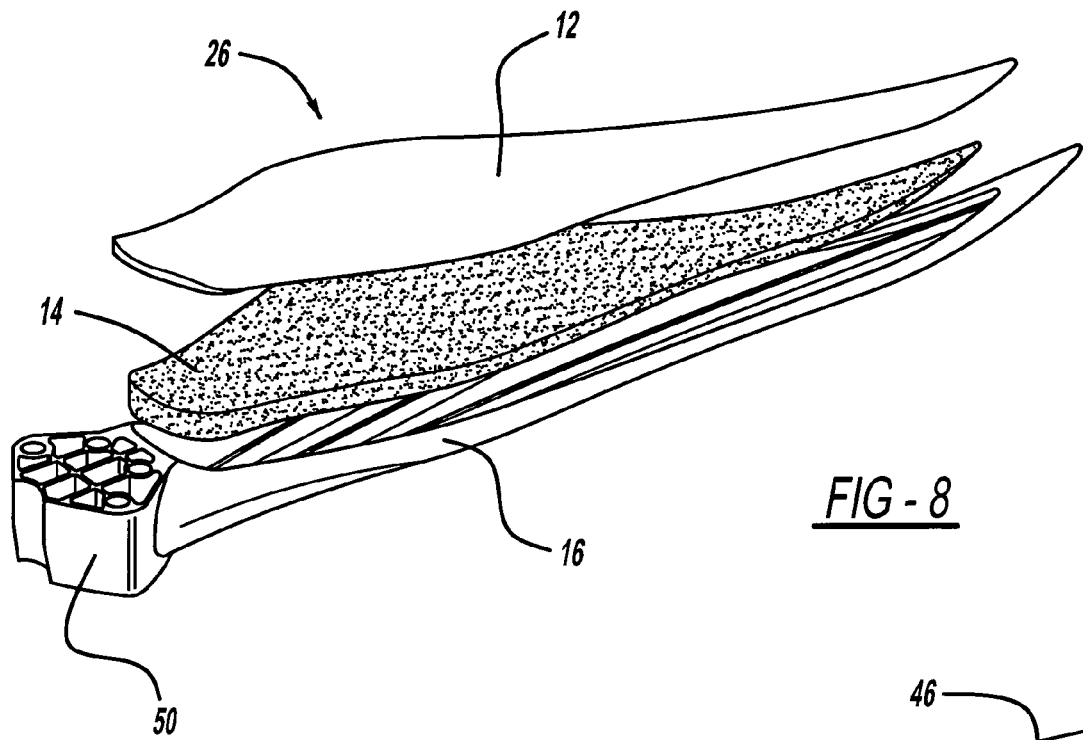
FIG. 8 is an exploded view of a one-piece wind blade made using an SMC, according to the present invention.

Referring to FIGS. 2 and 3, examples of strength versus deflection curves are shown which were created by testing (a three-point bend test) several sheets 10 produced according to the present invention. In FIG. 2, the sheets 10 used for the test included a top layer 12 and bottom layer 16 having a 1.5 millimeter in thickness, while the core 14 was 3.0 millimeters thickness. FIG. 2 includes a first deflection curve 28, a second deflection curve 30, and a third deflection curve 32 representing three different tests performed on three different sheets. In FIG. 3, the sheets 10 used for testing included a top layer 12 and bottom layer 16 of 1.5 millimeters in thickness, and a core 14 of 12.0 millimeters in thickness. FIG. 3 includes a fourth deflection curve 34, a fifth defection curve 36, and a sixth deflection curve 38, representing three different tests performed on three different sheets. Both of these examples in FIGS. 2 and 3 show improvement over a sheet 10 tested with no core, shown in FIG. 4. FIG. 4 shows three strength versus deflection curves. More specifically, FIG. 4 shows a seventh deflection curve 40, an eighth deflection curve 42, and a ninth deflection curve 44, representing three different tests from three different sheets 10, with each sheet having an overall thickness of 3.0 millimeters (and no core 14), which is the equivalent of the combined thickness of two layers of 1.5 millimeters in thickness.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for making a component of at least one thermoformable material, comprising the steps of:
   providing a first layer made of a first pre-impregnated material;
   providing a second layer made of a polymer material;
   providing a third layer made of said first pre-impregnated material;
   providing said first layer and said third layer to comprise several individually cut sheets of different sizes, said individually cut sheets used along different areas of said second layer for providing a different contour or thickness depending upon a predetermined desired shape of said component;
   providing an additional sheet that is in roll form and located at one end of said component, said additional sheet forming a connector for connection to a final assembly;
   placing said first layer, said second layer, and said third layer as an assembly into a mold such that said second layer is disposed between said first layer and said third layer to form a sheet; and
   curing said sheet in said mold by heating said mold to a desired cure temperature such that said first layer is bonded to said second layer, and said third layer is bonded to said second layer.

2. The method for making a component of at least one thermoformable material of claim 1, further comprising the steps of providing said desired cure temperature to be generally in the range of about 200° Fahrenheit to about 400° Fahrenheit.

3. The method for making a component of at least one thermoformable material of claim 1, further comprising the steps of providing said polymer material to be one selected from the group consisting of polyester, polypropylene, polyurethane, polyvinylchloride (PVC), styrene acrylonitrile resin (SAN), and combinations thereof.

4. The method for making a component of at least one thermoformable material of claim 1, further comprising the steps of selecting said first pre-impregnated material to be one selected from the group consisting of a sheet molding compound (SMC), Glass Mat Thermoplastic (GMT) material, aramid fibers, E-Glass, a carbon fiber material, a composite fiber material, and combinations thereof.

5. The method for making a component of at least one thermoformable material of claim 1, further comprising the steps of providing said first layer and said third layer to be a thickness of generally from about 1.0 millimeters to about 5.0 millimeters.

6. The method for making a component of at least one thermoformable material of claim 1, further comprising the steps of providing said second layer to be a thickness of generally from about 1.0 millimeters to about 50.8 millimeters.

7. The method for making a component of at least one thermoformable material of claim 1, further comprising the steps of providing said desired cure temperature to be in the range of about 250° Fahrenheit to about 350° Fahrenheit.

8. The method for making a component of at least one thermoformable material of claim 1, further comprising the steps of providing said desired cure temperature to be in the range of about 280° Fahrenheit to about 320° Fahrenheit.

9. The method for making a component of at least one thermoformable material of claim 1, further comprising the steps of providing said first layer and said third layer to be a thickness of from about 1.0 millimeters to about 2.0 millimeters.

10. The method for making a component of at least one thermoformable material of claim 1, further comprising the steps of providing said first layer and said third layer to be a thickness of from about 1.3 millimeters to about 1.7 millimeters.

11. The method for making a component of at least one thermoformable material of claim 1, further comprising the steps of providing said second layer to be a thickness of from about 1.0 millimeters to about 25.4 millimeters.

12. The method for making a component of at least one thermoformable material of claim 1, further comprising the steps of providing said second layer to be a thickness of from about 1.0 millimeters to about 5.0 millimeters.

13. The method for making a component of at least one thermoformable material of claim 1, further comprising the steps of providing said first layer and said third layer to have different thicknesses.

14. The method for making a component of at least one thermoformable material of claim 1, further comprising the steps of placing said first layer, second layer, third layer, and additional sheet into said mold as an assembly before said mold is heated, and said individually cut sheets melt to form the predetermined shape of said component.

* * * * *